(12) United States Patent
Ishikawa et al.

(10) Patent No.: US 9,716,280 B2
(45) Date of Patent: Jul. 25, 2017

(54) MAGNESIUM-AIR FUEL CELL

(71) Applicant: AQUA POWER SYSTEM, JAPAN, Ota-ku, Tokyo (JP)

(72) Inventors: Tadashi Ishikawa, Tokyo (JP); Yoshiaki Hasebe, Tokyo (JP); Masato Hamade, Gojo (JP)

(73) Assignee: AQUA POWER SYSTEM, JAPAN, Tokyo (JP)

( * ) Notice: Subject to any disclaimer, the term of this patent is extended or adjusted under 35 U.S.C. 154(b) by 22 days.

(21) Appl. No.: 14/653,256

(22) PCT Filed: Dec. 6, 2013

(86) PCT No.: PCT/JP2013/082880
§ 371 (c)(1),
(2) Date: Jun. 17, 2015

(87) PCT Pub. No.: WO2014/097909
PCT Pub. Date: Jun. 26, 2014

(65) Prior Publication Data
US 2015/0340704 A1    Nov. 26, 2015

(30) Foreign Application Priority Data
Dec. 18, 2012    (JP) .................................. 2012-276235

(51) Int. Cl.
*H01M 4/38* (2006.01)
*H01M 4/86* (2006.01)
(Continued)

(52) U.S. Cl.
CPC .......... *H01M 4/8657* (2013.01); *H01M 4/96* (2013.01); *H01M 12/06* (2013.01); *H01M 12/08* (2013.01); H01M 2004/8689 (2013.01)

(58) Field of Classification Search
CPC ................. H01M 12/06; H01M 12/08; H01M 2004/8689; H01M 4/8657; H01M 4/96; Y02E 60/50
See application file for complete search history.

(56) References Cited

U.S. PATENT DOCUMENTS 4,745,529 A    5/1988   Hamlen et al.
6,802,143 B1 *  10/2004  Rachowitz .......... G09F 15/0081
                                                              40/473
(Continued)

FOREIGN PATENT DOCUMENTS

JP    63-114080 A    5/1988
JP    4-192270 A    7/1992
(Continued)

OTHER PUBLICATIONS

International Search Report mailed Jan. 21, 2014, corresponding to International application No. PCT/JP2013/082880.

*Primary Examiner* — Patrick Ryan
*Assistant Examiner* — Ben Lewis
(74) *Attorney, Agent, or Firm* — Hauptman Ham, LLP

(57) ABSTRACT

Provided is a highly water repellent, air permeable, and liquid leakage resistant magnesium-air fuel cell that can quickly achieve a discharge reaction peak and can discharge a predetermined amount of current for a relatively long period of time. In a magnesium-air fuel cell, a cathode body includes: a first layer including a porous body formed by mixing a conductive carbon material and fluororesin; and a second layer including a porous body formed by mixing activated carbon and fluororesin, the second layer being joined to one surface of the first layer to be in contact with reaction liquid in the outer frame.

11 Claims, 12 Drawing Sheets

(51) Int. Cl.
*H01M 12/08* (2006.01)
*H01M 4/96* (2006.01)
*H01M 12/06* (2006.01)

(56) References Cited

U.S. PATENT DOCUMENTS

2007/0166602 A1* 7/2007 Burchardt ............ H01M 4/8652
                                                                 429/406
2013/0029234 A1* 1/2013 Roev ...................... B82Y 30/00
                                                                 429/405
2013/0115526 A1* 5/2013 Friesen ................ H01M 12/06
                                                                 429/403

FOREIGN PATENT DOCUMENTS

| JP | 1994-338355 A | 12/1994 |
| --- | --- | --- |
| JP | 7-211322 A | 8/1995 |
| JP | 10-83841 A | 3/1998 |
| JP | 2004-63262 A | 2/2004 |
| JP | 2012-243657 A | 12/2012 |

* cited by examiner

FIG.11
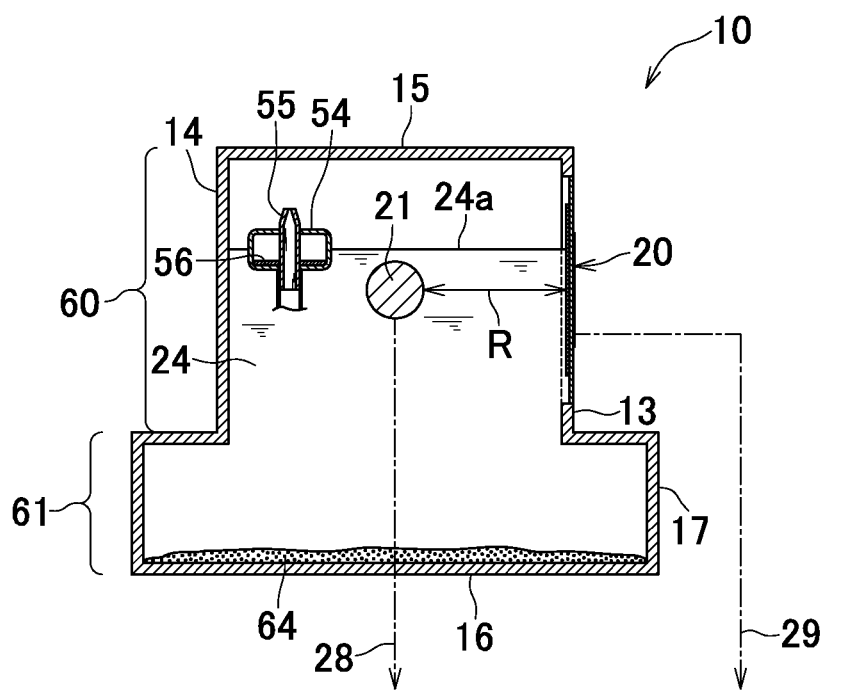
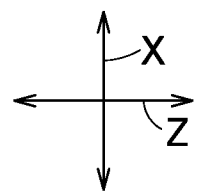

FIG.12
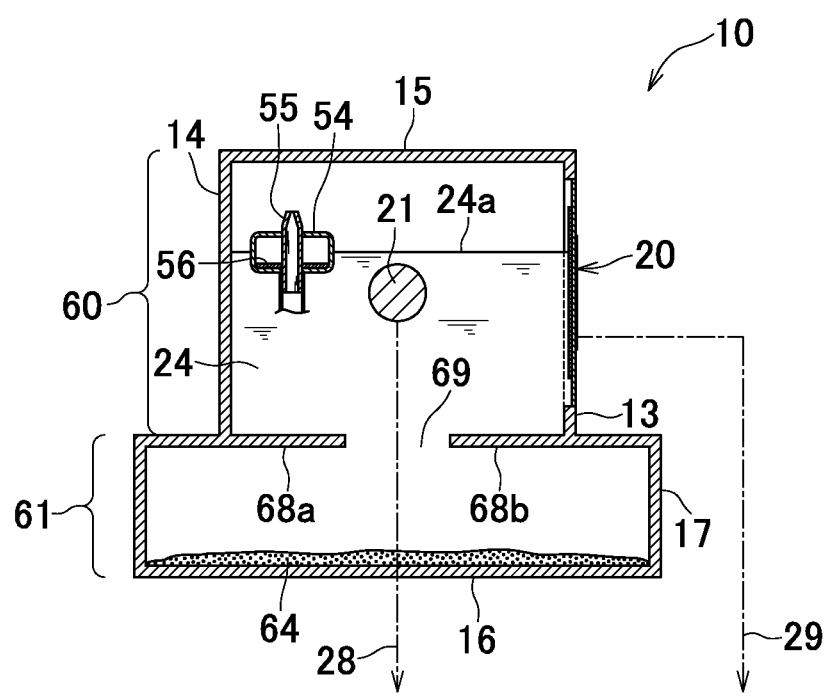
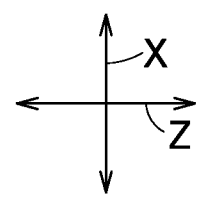

MAGNESIUM-AIR FUEL CELL

RELATED APPLICATIONS

The present application is a National Phase of International Application Number PCT/JP2013/082880, filed Dec. 6, 2013, and claims priority from, Japanese Application Number 2012-276235, filed Dec. 18, 2012.

TECHNICAL FIELD

The present invention relates to a fuel cell that generates power by using a fuel such as air or water, and particularly relates to a magnesium-air fuel cell.

BACKGROUND

Conventionally, fuel cells are known that uses a natural fuel, such as air or water, as a cathode and magnesium and the like as an anode. For example, Patent Literature 1 discloses a fuel cell using a cathode body obtained by stacking a porous film (water repellant film) made of fluororesin on one surface of a sheet formed of a mixture of catalyst powder, activated carbon, and fluororesin powder.

CITATION LIST

Patent Literature

{PTL 1} JP 1994-338355 A

SUMMARY

Technical Problem

In the metal-air electrochemical cell disclosed in Patent Literature 1, the cathode body having excellent water repellency and adhesion can be obtained by pressure bonding the water repellent film to the catalyst sheet. Unfortunately, the water repellent film is relatively thin and thus is easily torn. Thus, there has been a problem in that leakage of reaction liquid through a portion that has been torn during operation hinders sufficient charging/discharging.

An object of the present invention to improve a magnesium-air fuel cell according to a conventional technique, and to provide a highly water repellent, air permeable, and liquid leakage resistant magnesium-air fuel cell that can quickly achieve a discharge reaction peak and can discharge a predetermined amount of current for a relatively long period of time.

Solution to Problem

To solve the problem, the present invention is directed to a magnesium-air fuel cell including: an outer frame; a cathode body fixed to the outer frame; and an anode body positioned in the outer frame.

In the magnesium-air fuel cell according to the present invention, the cathode body includes: a first layer including a porous body formed by mixing a conductive carbon material and fluororesin; and a second layer including a porous body formed by mixing activated carbon and fluororesin, the second layer being joined to one surface of the first layer to be in contact with reaction liquid in the outer frame.

According to an aspect of the present invention, a third layer, including a conductive metal material, may be joined to another surface of the first layer on a side opposite to the one surface.

According to another aspect of the present invention, a mixing rate of the fluororesin mixed in the first layer may be about 10 to 50% by weight, and a mixing rate of the fluororesin mixed in the second layer may be about 3 to 30% by weight.

According to a still another aspect of the present invention, the second layer may have a shorter external length than the first layer, and the third layer may be thinner than the second layer.

According to a still another aspect of the present invention, the third layer may be a porous body.

According to a still another aspect of the present invention, the outer frame may include: a liquid injected area defined by the reaction liquid injected in the outer frame; a space positioned above the liquid injected area; and a ventilation system including a float that floats on a liquid surface of the liquid injected area and an air pipe through which produced gas in the outer frame is discharged, the air pipe may have one end coupled to an opening formed in an outer surface of the outer frame and another end coupled to a joint formed through the float, and an open end of the joint may be positioned in the space.

According to a still another aspect of the present invention, the outer frame may have a cross-sectional shape with a protrusion and includes a narrow portion and a wide portion having inner portions in communication with each other, and the anode body and the cathode body may be positioned while facing each other in any one of the narrow portion and the wide portion.

According to a still another aspect of the present invention, a pair of inner walls that are separated from each other and face each other may be disposed between the narrow portion and the wide portion in the outer frame.

According to a still another aspect of the present invention, an average pore diameter and a pore capacity of the first layer may respectively be about 1 to 200 nm and 0.1 to 4.0 ml/g.

According to a still another aspect of the present invention, an average pore diameter and a pore capacity of the second layer may respectively be about 1 to 200 nm and 0.1 to 3.0 ml/g.

According to a still another aspect of the present invention, the magnesium-air fuel cell further may include a light source electrically connected to the cathode body and the anode body.

According to a still another aspect of the present invention, the magnesium-air fuel cell may further include an operation unit with which power supply to the light source is able to be turned ON and OFF.

Advantageous Effects of Invention

In the magnesium-air fuel cell according to the present invention, the cathode body includes: a first layer including a porous body formed by mixing a conductive carbon material and fluororesin; and a second layer including a porous body formed by mixing activated carbon and fluororesin, the second layer being joined to one surface of the first layer to be in contact with reaction liquid in the outer frame. Thus, the resultant highly water repellent and air permeable magnesium-air fuel cell can achieve a discharge reaction peak earlier and can generate a predetermined amount of current for a relatively long period of time compared with a case where the cathode body only includes the first layer or the second layer. Furthermore, because the entire cathode body is formed of the porous body, a large specific surface area can be achieved. Thus, a large amount of oxygen can be taken in, and a large amount of current can be generated.

BRIEF DESCRIPTION OF DRAWINGS

FIG. 11 is a schematic cross-sectional view taken along line XI-XI in FIG. 10.

FIG. 12 is a schematic cross-sectional view that is similar to that in FIG. 11 and illustrates an example of a modification of the magnesium-air fuel cell in the third embodiment.

DESCRIPTION OF EMBODIMENTS

<First Embodiment>

Figure 1:
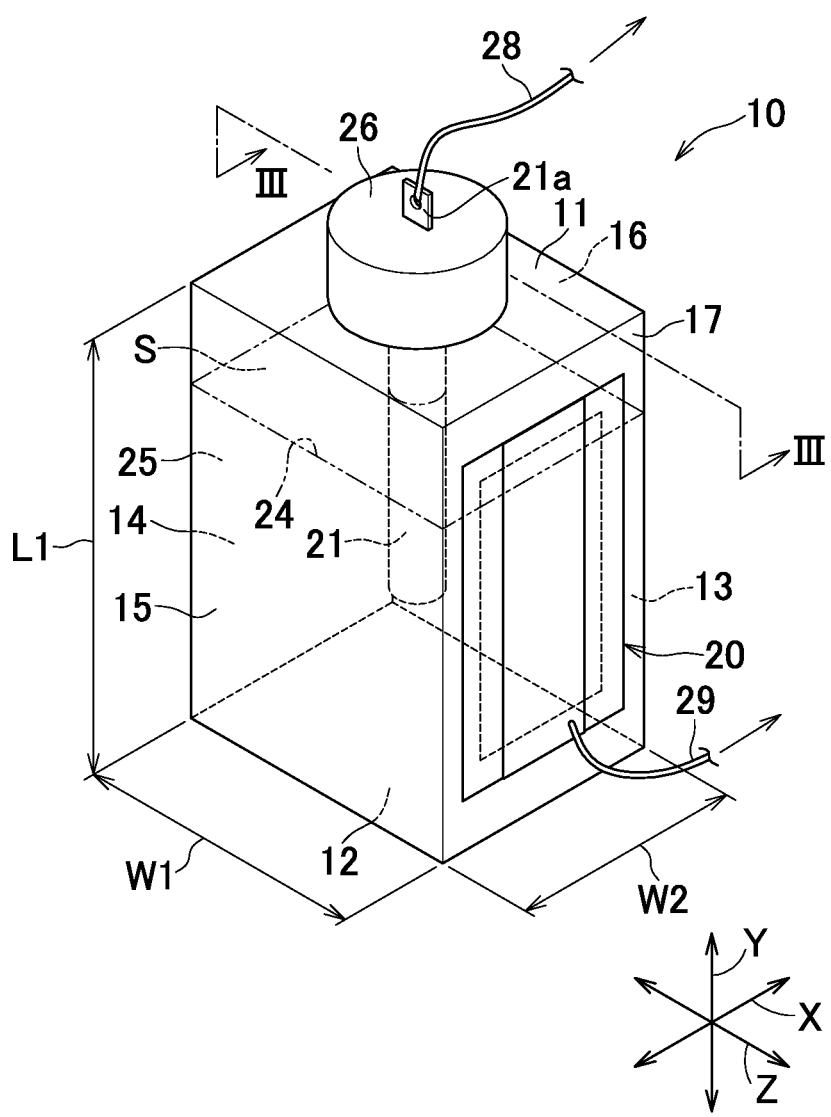
FIG. 1 is a perspective view of a magnesium-air fuel cell in a first embodiment of the present invention.
Figure 2A:
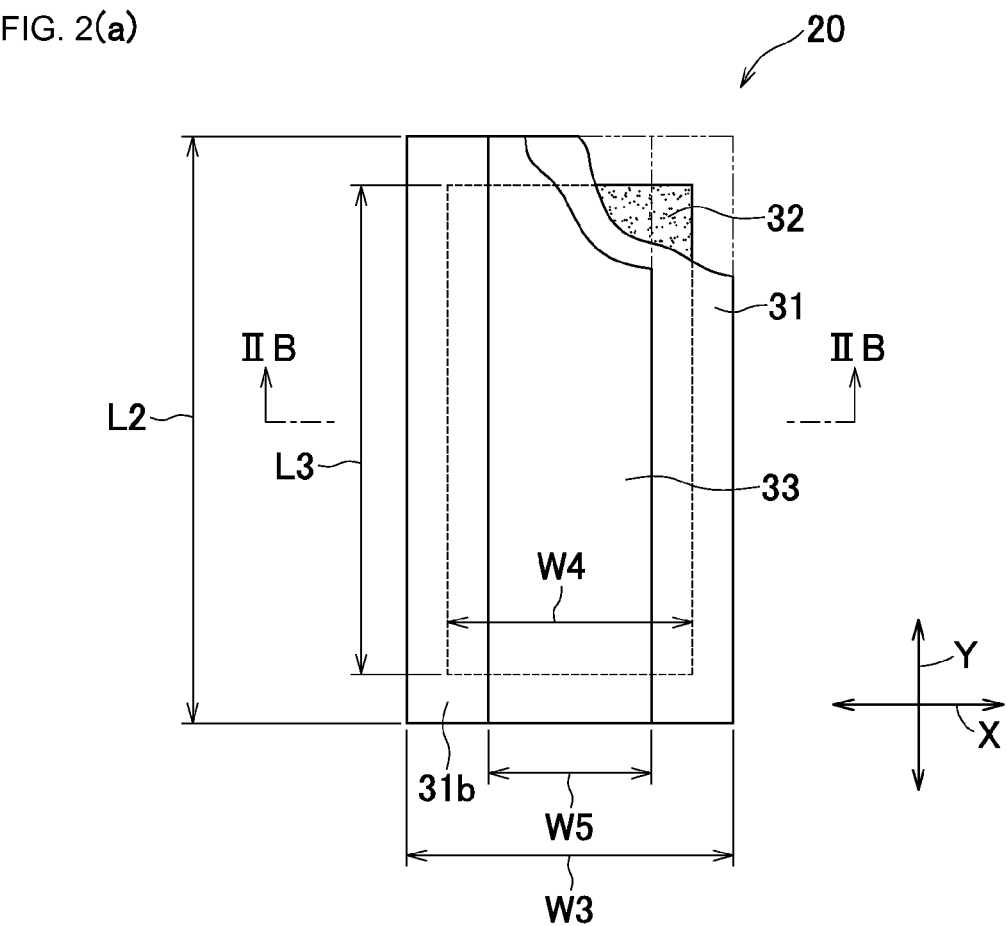
FIG. 2(a) is a partially cutout plan view of a cathode body.
Figure 2B:
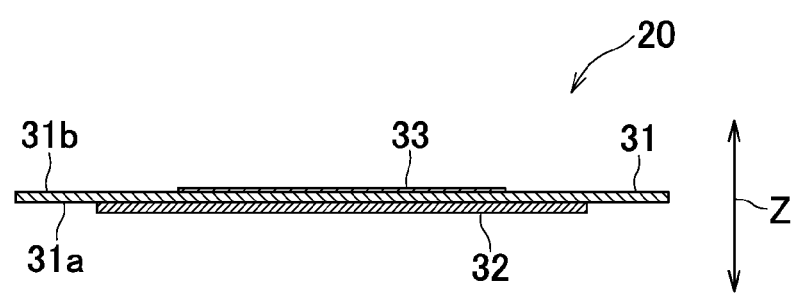
FIG. 2(b) is a schematic cross-sectional view taken along line IIB-IIB in FIG. 2(a).

As illustrated in FIGS. 1 and 2, for a magnesium-air fuel cell 10 according to a first embodiment, a height direction Y, a width direction X, and a depth direction Z orthogonal to the directions are defined. The magnesium-air fuel cell 10 includes an outer frame 17 having a rectangular parallelepiped shape. The outer frame 17 includes: first and second surfaces 11 and 12 facing each other in the height direction Y; third and fourth surfaces 13 and 14 facing each other in the depth direction Z; and a fifth surface 15 and a sixth surface 16 facing each other in the width direction X. The magnesium-air fuel cell 10 has a length L1 of about 50 to 100 mm in the height direction Y, a length W1 of about 20 to 70 mm in the depth direction Z, and a length W2 of about 20 to 70 mm in the width direction X. The magnesium-air fuel cell 10 can produce electromotive force of about 1.0 to 2.0 V. The magnesium-air fuel cell 10 can be used as a power source for an electromechanical device installed in a large tanker such as ships, or as an emergency power source to be used in case of disaster or the like. In such a case, each of the lengths L1, W1, and W2 may be several meters or longer, and a plurality of the magnesium-air fuel cells 10 of such a size may be combined to produce even larger electrical power.

The outer frame 17 is made of a rigid plastic material. A cathode body (air electrode) 20 having a thin-rectangular plate shape is positioned on the third surface 13. An anode body 21 having a rod shape is removably inserted in the outer frame 17. A predetermined amount of reaction liquid 24 can be injected in to the outer frame 17. The outer frame 17 includes a liquid injected area 25 and a space S positioned above the liquid injected area 25. The liquid injected area 25 is formed by injecting the liquid in an amount corresponding to about 60 to 80% of the capacity of the entire outer frame 17. A lid 26, having an opening, is removably screwed onto a center portion of the first surface 11 of the outer frame 17. The anode body 21 has an end 21a inserted to the opening to be fixed. The end 21a of the anode body 21 is provided with a through hole to which a lead wire 28 is attached. A lead wire 29, extending to the outside of the outer frame 17, is attached to the cathode body 20.

In the magnesium-air fuel cell 10 with such a configuration, an ionization reaction occurs between the cathode body 20 and the anode body 21 with the reaction liquid 24, injected into the outer frame 17, serving as an oxidation catalyst. Electrons produced from the ionized anode body 21 react with the oxygen in the cathode body 20 and with water in the reaction liquid 24 to cause a discharge reaction. Thus, due to the resultant potential difference between the cathode body 20 and the anode body 21, predetermined electromotive force is produced. When such electromechanical reaction occurs, magnesium hydroxide and reactant gas (hydrogen gas) are produced in the outer frame 17. Reaction liquid other than water such as saltwater may be used as the reaction liquid 24. When the lid 26 is removed and thus the anode body 21 in the outer frame 17 is pulled out, the electrochemical reaction is terminated and thus the electromotive force is no longer produced. After the lid 26 is removed, liquid such as water can be injected into the outer frame 17, and the liquid in the outer frame 17 can be discharged for injecting new liquid. An electrode active material with relatively high ionization tendency such as magnesium metal, aluminum, and zinc may be used for the anode body 21.

The cathode body 20 is formed by stacking a plurality of layers one on top of the other, and includes: a first layer (electrode layer) 31 that is formed of a conductive material such as a carbon material; a second layer (active layer) 32 that is attached to one surface 31a of the first layer 31 and is formed of a cathode active material such as activated carbon; and a plate-shaped third layer (collector layer) 33 that is attached to the other surface 31b of the first layer 31 and is formed of conductive metal. A side of the cathode body 20, on which the second layer 32 is disposed, is positioned in the outer frame 17. The entire surface of the second layer 32 and a portion of the one surface 31a of the first layer 31 extending outward from the outer circumference of the second layer 32 are in contact with the reaction liquid 24 in the outer frame 17.

The first layer 31 is a sheet-shaped porous body formed by mixing fluororesin into an air-permeable-liquid-impermeable carbon material at a predetermined rate. The mixing rate (percent by weight) of fluororesin is about 3 to 50% by weight, preferably about 10 to 50% by weight, more preferably about 20 to 40% by weight. When the mixing rate of fluororesin is equal to or higher than 50% by weight, the first layer 31 as a whole is highly insulative and thus might fail to achieve sufficient conductivity to serve as an electrode film. For example, the carbon material, used for the first layer 31, is preferably graphite, carbon black, and the like having water repellency and electric conductivity. For example, when the carbon black is used, a known material is available including acetylene black, channel black, furnace black, and Ketjen black. For example, the fluororesin, used for the first and the second layers 31 and 32, is preferably a material that transforms into a fiber form upon receiving shearing force. For example, polytetrafluoroethylene (PTFE), polytrifluoroethylene, polyvinylidene fluoride, and the like may be used.

The term "porous body" means that the first layer 31 is the sheet formed by mixing the fluororesin as a binder and a particulate carbon material, and thus a gap between particles is more surely secured compared with where a thermoplastic synthetic resin or the like is used as the binder, whereby the air permeability is ensured. The first layer 31 is the porous body and thus ensures the air permeability, and with the fluororesin mixed, a predetermined waterproofing property can be achieved, so that the reaction liquid can be effectively prevented from leaking. The term "air-permeable-liquid-impermeable" means that the first layer 31 is the porous body but still has a function of preventing the reaction liquid from leaking out through the second layer in contact with the reaction liquid. An even higher waterproofing function can be achieved when the blending ratio of fluororesin in the first layer 31 is higher than the blending ratio of fluororesin in the second layer 32.

The first layer 31 as the porous body has an average pore diameter of about 1 to 200 nm and a porous capacity in the range of 0.1 to 4.0 ml/g. Preferably, the average pore diameter is about 20 to 50 nm and the porous capacity is in the range of 0.5 to 1.0 ml/g. Generally, the surface tension is produced on the surface when the average pore diameter and the porous capacity of the porous body are relatively small, whereby liquid infiltration can be prevented. On the other hand, when the average pore diameter and the porous capacity are relatively large, the water infiltrates into the porous body to block the oxygen supply, and thus a current value is reduced. The water might even leak from the porous body as a result of infiltration of an excessive amount of water. In the present invention, the average pore diameter and the pore capacity of the first layer 31 are in the ranges described above, whereby the reaction liquid can be prevented from leaking through the pores and sufficient air permeability through the pores can be achieved. All things considered, these technical effects, which are usually in a tradeoff relationship, can be both achieved. After the reaction liquid 24 infiltrates into the second layer 32, a predetermined current value can be maintained for a relatively long period of time.

The second layer 32 is a powder-like porous body or a sheet-like porous body with a plurality of openings formed, and is formed by mixing the activated carbon and the fluororesin at a predetermined ratio. The second layer 32 is fixed via conductive adhesive applied on the one surface 31a of the first layer 31. The mixing rate of (weight percent) of the fluororesin is about 3 to 50% by weight, preferably about 3 to 30% by weight, and more preferably about 5 to 20% by weight. When the mixing rate is equal to or higher than 30%, an electric capacity is low due to the low activated carbon content. Furthermore, wettability is degraded due to extremely high water repellency. As a result, electrical properties as the active layer might not be able to be achieved. The activated carbon, which is generally used as an electrode material of this type, has an extremely large specific surface area as a result of activation. Thus, an electrode with a large electrical capacity per unit volume can be formed. The term "porous body" of the second layer 32 means that when the sheet is formed by mixing the fluororesin as a binder with the activated carbon, a gap between particles is more surely secured compared with where a thermoplastic synthetic resin or the like is used as the binder, whereby the air permeability is ensured, and a porous structure on the activated carbon surface is maintained, so that an excellent adsorptivity can be achieved.

The second layer 32 as the porous body has an average pore diameter of about 1 to 200 nm and a porous capacity in the range of 0.1 to 3.0 ml/g. Preferably, the average pore diameter is about 10 to 40 nm and the porous capacity is in the range of 0.2 to 1.5 ml/g. When the average pore diameter and the pore capacity of the second layer 32 are in the ranges described above, the infiltration speed of the reaction liquid 24 can be reduced, and a peak current value can be maintained for a relatively long period of time.

The third layer 33, which is optionally provided, is formed of at least one metal material including copper, nickel, aluminum, stainless steel, titanium, and the like, and has a foil, plate, or sheet form. The third layer 33 is fixed through the conductive adhesive applied on the other surface 31b of the first layer 31. The third layer 33 may be a composite material obtained by coating a conductive metal material such as stainless steel (SUS) with highly conductive metal such as gold and silver. Alternatively, the third layer 33 may be a porous body having a mesh or net form obtained by performing punching and the like on a metal material. When the third layer 33 is a porous body (layer), the first to the third layers 31, 32, and 33 are all porous bodies, whereby excellent air permeability can be achieved to take in a large amount of oxygen. Furthermore, the third layer 33 can be pressure bonded to the other surface 31b of the first layer 31 instead of being adhered. The third layer 33 may be disposed between the first layer 31 and the second layer 32. Still, the third layer 33, disposed on the other surface 31b on a side of the second layer 32 opposite to the one surface 31a as in the present embodiment, does not get wet by the reaction liquid 24, and does not negatively affect the air permeability of the first and the second layers 31 and 32, so that an even larger amount of discharge current can be obtained. The third layer 33 may be formed to be thinner than the second layer 32 instead of being formed as a porous body, so that sufficient air permeability to the first layer 31 and the second layer 32 can be guaranteed.

<Method for Measuring Average Diameter and Capacity of Pore in First and Second Layers>

The average diameter and the capacity of the pores in the first layer 31 and the second layer 32 were measured by using a porosimeter 2000 as a pore distribution meter manufactured by CARLO ERBA INSTRUMENTS Ltd. to measure an average pore diameter distribution (pore diameter: 7.6 nm to 12.6 μm) by mercury prosimetry. The average diameter and the capacity of pores in the first layer 31 and the second layer 32 depend on a particle size and an inter particle distance of the carbon material and the activated carbon. Thus, the particle size, a molding condition, and the like were adjusted to achieve the average pore diameter and the pore capacity within predetermined ranges.

Figure 3:
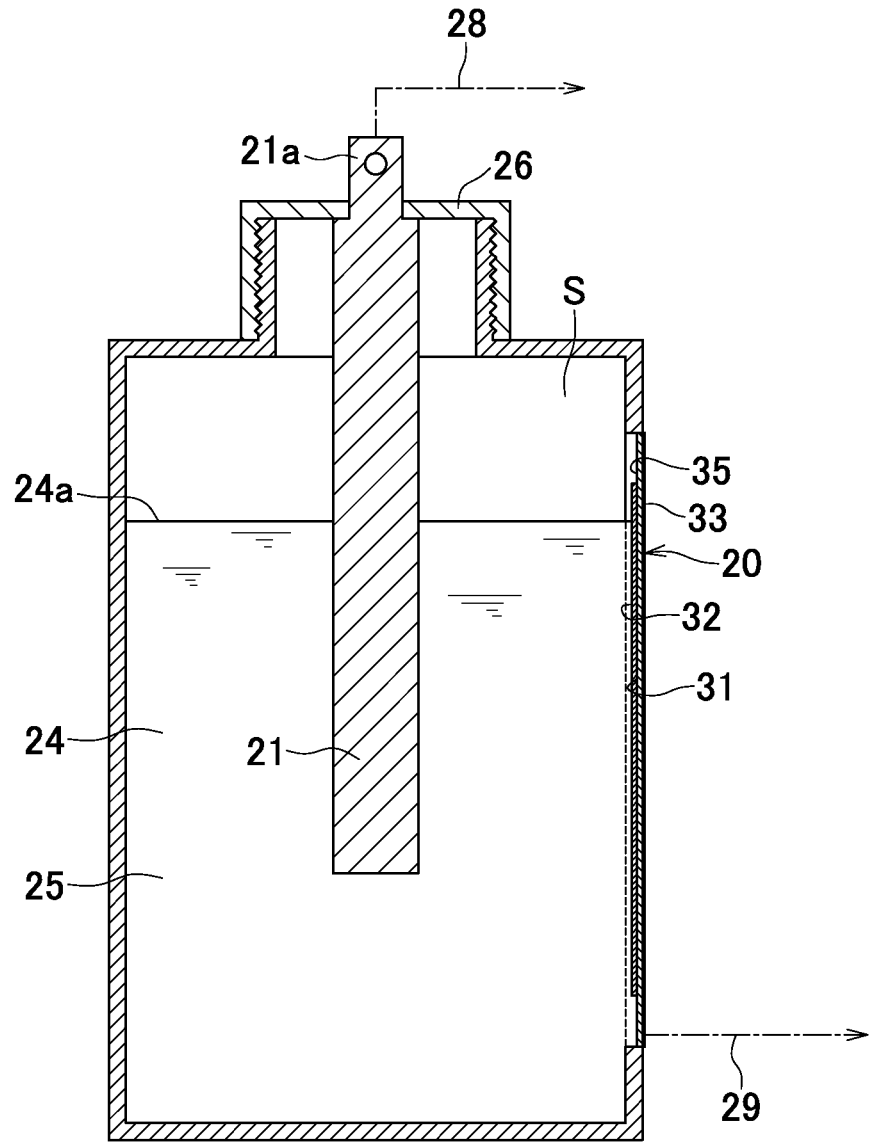
FIG. 3 is a cross-sectional view taken along line III-III in FIG. 3.

As illustrated in FIG. 3, the second layer 32 is disposed on a side of the cathode body 20 to be in contact with the reaction liquid 24. With the second layer 32 disposed in the outer frame 17, the discharge reaction peak can be achieved quicker and a larger amount of current can be obtained, compared with a case where the second layer 32 is not used and thus the first layer 31 is in direct contact with the reaction liquid 24. More specifically, the activated carbon adsorbs a larger amount of oxygen compared with the carbon material and the like, and with a quick reaction with electrons, the shorter period to the peak and the larger current can be achieved. When only the second layer 32, formed by molding the activated carbon and the fluororesin into a sheet form, is used, the reaction liquid gradually filtrates into the second layer 32 to make the air difficult to flow in, and thus the discharge reaction might be weakened. Thus, with the air-permeable-liquid-impermeable first layer 31 disposed on the outer side, the filtration of the reaction liquid 24 is prevented, so that the efficient air permeation can be obtained over the entire cathode body 20. Thus, the discharge reaction on the second layer 32 can be maintained for a long period of time and the cathode body 20 can have a longer service life to serve as an electrode. A section 35 of the portion of the first layer 31 extending outward from the outer circumference of the second layer 32 is positioned in the space S above the liquid injected area 25. Thus, the produced gas filled inside is discharged to the outside through the section 35, whereby the outer frame 17 can be prevented from having a high inner pressure.

In the present embodiment, the lengths of each of the layers forming the cathode body 20 are set as follows. Specifically, the length L2 in the height direction Y is about 50 to 90 mm, the length W3 (width) in the width direction X is about 20 to 60 mm, and the length in the depth direction Z is about 1.0 to 1.5 mm. The second layer 32 is a size smaller than the first layer 31, and has a length L3 of about 30 to 70 mm in the height direction Y and a length W4 of about 15 to 55 mm in the width direction X. The third layer 33 has a length in the height direction Y that is approximately the same as that of the first layer 31, but is thinner than the first and the second layers 31 and 32. More specifically, a length (width) W5 of the third layer 33 in the width direction X is about 15 to 30 mm. Because the third layer 33 is thinner than the first and the second layers 31 and 32, the third layer 33 does not hinder the flow of air through the first and the second layers 31 and 32. Thus, a predetermined amount of current can be obtained.

In the cathode body 20, the first layer 31 and the second layer 32 may have the same size. The configuration of the present embodiment can be employed in a normal battery having various sizes such as a size AA or D, or in a large power source device in ships, semiconductor factories, and the like.

Figure 4:
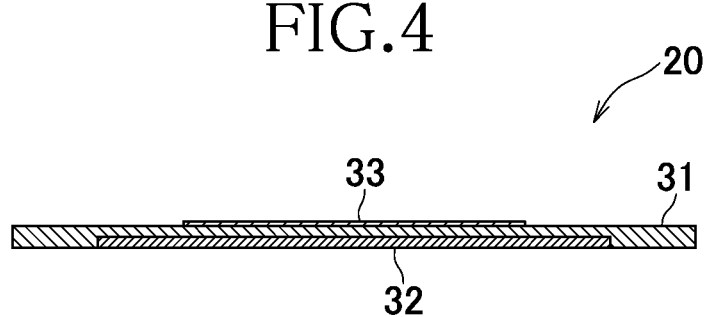
FIG. 4 is a schematic cross-sectional view that is similar to that in FIG. 2(b) and illustrates an example of a modification of the cathode body.

FIG. 4 illustrates a modification of the cathode body 20. This cathode body 20 has a three layer structure in which the first to the third layers 31, 32, and 33 are stacked on top of the other. The first layer 31 covers the entire outer circumference of the second layer 32 except for the surface side. In such a structure, a stacked structure of the first and the second layers 31 and 32 is obtained as follows. More specifically, the first layer 31 having an outer shape a size larger than the second layer 32 is stacked on the second layer 32, and the resultant structure is extended by pressure. In the cathode body 20 according to this example, the first layer 31 covers the entire outer circumference of the second layer 32 except for the surface. Thus, the reaction liquid 24 is prevented from infiltrating into the entire second layer 32, and can be effectively prevented from leaking out of the outer frame 17.

Figure 5:
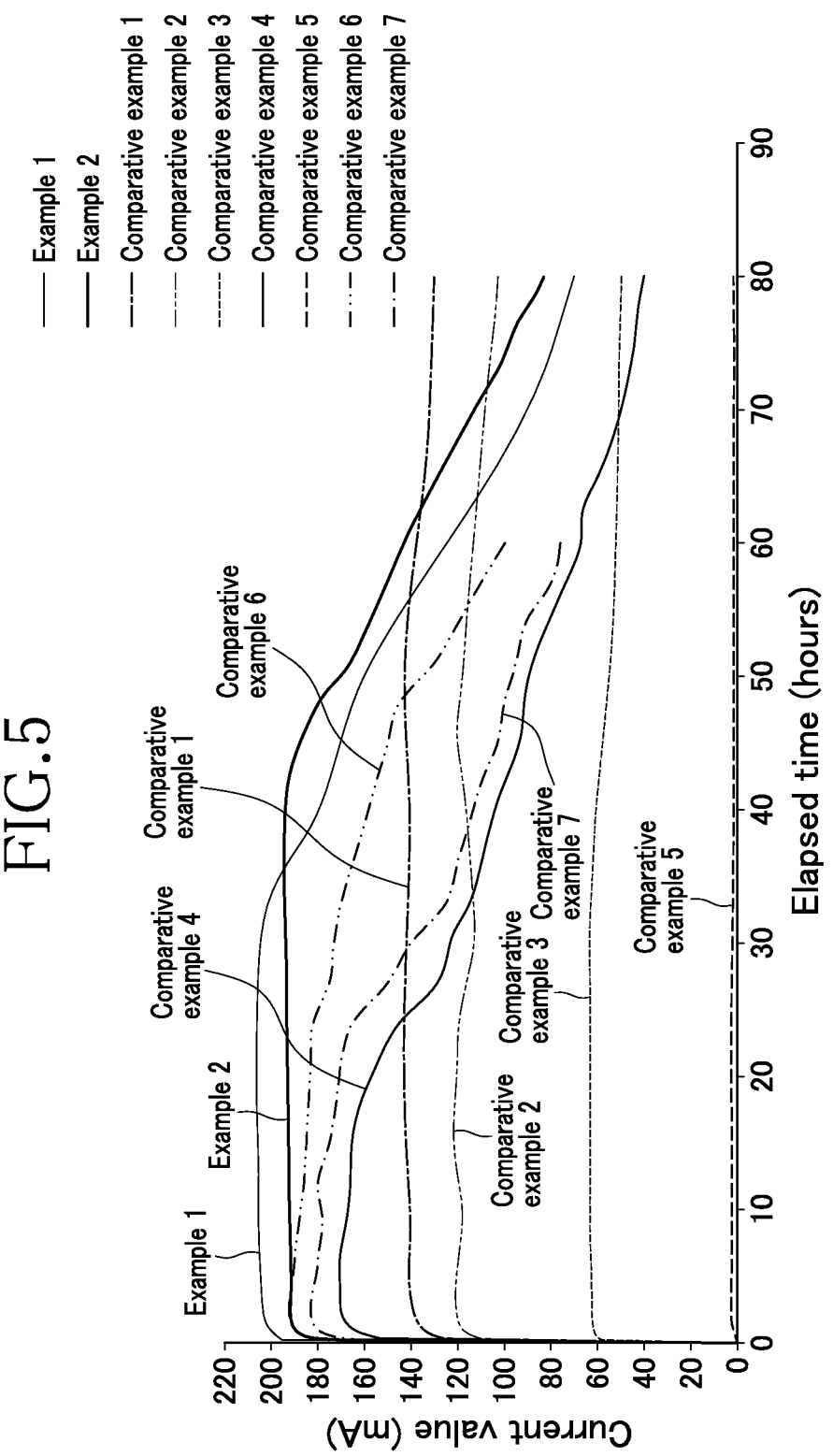
FIG. 5 is a graph illustrating how a discharge current value of the magnesium-air fuel cell changes over time in different compositions of first to third layers and configurations of the cathode body.

FIG. 5 is a graph illustrating a generated current value (mA) and an elapsed time (h) where the cathode body 20 including only the first layer (electrode layer) 31 (Comparative Examples 1 to 3), where the cathode body 20 including only the second layer (active layer) 32 (Comparative Example 4), and where the cathode body 20 including a two layer structure including the first layer 31 and the second layer 32 is used (examples 1 and 2). In each example, the third layer 33 is joined to the one surface. In the magnesium-air fuel cell 10 used in the measurement, the lengths L1, W1, and W2 of the outer frame 17 are respectively about 100 mm, about 60 mm, and about 60 mm. The lengths L2, L3, W3, W4, and W5 of the cathode body 20 are respectively about 72 mm, about 60 mm, about 40 mm, about 30 mm, and about 20 mm. Examples 1 and 2 and Comparative Examples 1 to 5 were measured for about 80 hours, and Comparative Examples 6 and 7 were measured for about 60 hours.

EXAMPLE 1

In Example 1, a cathode body is used that has a two layer structure including: the first layer 31 as a mixture of 77% by weight of carbon material and 23% by weight of fluororesin; and the second layer 32 as a mixture of 95% by weight of activated carbon and 5% by weight of fluororesin. The average pore diameter and the pore capacity of the first layer 31 are respectively 40 nm and 1 ml/g. The average pore diameter and the pore capacity of the second layer 32 are respectively y 40 nm and 1.5 ml/g.

EXAMPLE 2

In Example 2, a cathode body is used that has a two layer structure including: the first layer 31 as a mixture of 77% by weight of carbon material and 23% by weight of fluororesin; and the second layer 32 as a mixture of 79% by weight of activated carbon, 6% by weight of carbon material, and 15% by weight of fluororesin. The average pore diameter and the pore capacity of the first layer 31 are respectively 40 nm and 1 ml/g. The average pore diameter and the pore capacity of the second layer 32 are respectively 30 nm and 1.0 ml/g.

COMPARATIVE EXAMPLE 1

In Comparative Example 1, a cathode body is used that only includes the first layer 31 as a mixture of 95% by weight of carbon material and 5% by weight of fluororesin.

COMPARATIVE EXAMPLE 2

In Comparative Example 2, a cathode body only includes the first layer 31 as a mixture of 77% by weight of carbon material and 23% by weight of fluororesin.

COMPARATIVE EXAMPLE 3

In Comparative Example 3, a cathode body only includes the first layer 31 as a mixture of 50% by weight of carbon material and 50% by weight of fluororesin.

COMPARATIVE EXAMPLE 4

In Comparative Example 4, a cathode body only includes the second layer 32 as a mixture of 79% by weight of activated carbon, 6% by weight of carbon material, and 15% by weight of fluororesin.

COMPARATIVE EXAMPLE 5

In Comparative Example 5, a cathode body 20 is used that has a two layer structure including: the first layer 31 as a mixture of 77% by weight of carbon material and 23% by weight of fluororesin; and the second layer 32 as a mixture of 40% by weight of activated carbon and 60% by weight of fluororesin.

COMPARATIVE EXAMPLE 6

In Comparative example 6, a cathode body 20 is used that has a two layer structure including: the first layer 31 as a mixture of 77% by weight of carbon material and 23% by weight of fluororesin; and the second layer 32 as a mixture of 79% by weight of activated carbon, 6% by weight of carbon material, and 15% by weight of fluororesin. The average pore diameter and the pore capacity of the first layer 31 are respectively 40 nm and 1 ml/g. The average pore diameter and the pore capacity of the second layer 32 are respectively 250 nm and 4.0 ml/g.

COMPARATIVE EXAMPLE 7

In Comparative example 7, a cathode body 20 is used that has a two layer structure including: the first layer 31 as a mixture of 77% by weight of carbon material and 23% by weight of fluororesin; and the second layer 32 as a mixture of 79% by weight of activated carbon, 6% by weight of carbon material, and 15% by weight of fluororesin. The average pore diameter and the pore capacity of the first layer 31 are respectively 250 nm and 5.0 ml/g. The average pore diameter and the pore capacity of the second layer 32 are respectively 250 nm and 4.0 ml/g.

As illustrated in the graph in FIG. 5, in Examples 1 and 2, the current value has reached the peak value (about 200 mA) relatively early (in about 1 to 2 minutes after the start), and a high current value was able to be stably produced for 40 to 50 hours. A time period during which the peak value is maintained was shorter in Example 1 than in Example 2 presumably because the anode body 21 is consumed quickly due to the larger content of the activated carbon facilitating the ionization reaction with the anode body 21. In Comparative Examples 1 to 3, a predetermined current value can be maintained for a relatively long period of time (about 80 hours) until the anode body 21 is consumed. However, the peak value is 30 to 70% of those in Examples. In Comparative Example 4, the current value has started to reduce gradually when about 15 hours have elapsed, due to infiltration of water into the activated carbon, and the current value is reduced to the half the peak value when about 50 hours have elapsed. In Comparative Example 5, the second layer 32 has a high mixing rate of fluororesin and much lower rate of activated carbon. Thus, a sufficient amount of oxygen was unable to be taken in, and smooth movement of electrons was not achieved. As a result, only extremely minute amount of current was generated.

As described above, the cathode body 20 having the two layer structure including the first layer 31 and the second layer 32 has the following advantages over the configurations including only the first layer 31 or the second layer 32. Specifically, the peak current of a predetermined amount can be achieved relatively early and can be maintained for a relatively long period of time without causing infiltration of water into the second layer 32 or reducing the current value. Although the current value starts to be gradually reduced after 50 hour elapses, the peak current value can be achieved again by replacing the anode body 21 and the reaction liquid (water) 24.

It can be found through the comparison between Example 2 and Comparative Examples 6 and 7 that Example 2 and Comparative Examples 6 and 7 have the same mixing rates of the materials forming the first layer 31 and the second layer 32, and are only different from each other in the average pore diameter and the pore capacity. More specifically, it can be found through the comparison between Example 2 and Comparative Example 6 that the average pore diameter and the pore capacity of the second layer 32 in Example 2 are respectively 30 nm and 1 ml/g, whereas the average pore diameter and the pore capacity of the second layer 32 in Comparative Example 6 are respectively 250 nm and 4 ml/g. As illustrated in the graph, the current value drops more sharply in Comparative Example 6 than in example 2. This is presumably the case because the water infiltration has occurred to hinder oxygen supply due to relatively large average pore diameter and pore capacity of the second layer 32.

In Comparative Example 7, the average pore diameter and the pore capacity of the first layer 31 are respectively 250 nm and 5 ml/g, and the average pore diameter and the pore capacity of the second layer 32 are respectively 250 nm and 4 ml/g. Thus, the average pore diameters and the pore capacities of the first and second layers 31 and 32 are relatively large. Thus, as in Comparative Example 6, the water infiltrates into the second layer 32, and the oxygen supply reduces along with time to reduce the current amount. Then, the current sharply drops due to filtration of the water into the first layer 31. As described above, Example 2 has the average pore diameter and the pore capacity more in the suitable range compared with these Comparative Examples. Thus, the electric characteristics can be maintained, that is, prevented from degrading for a long period of time.

<Second Embodiment>

Figure 6:
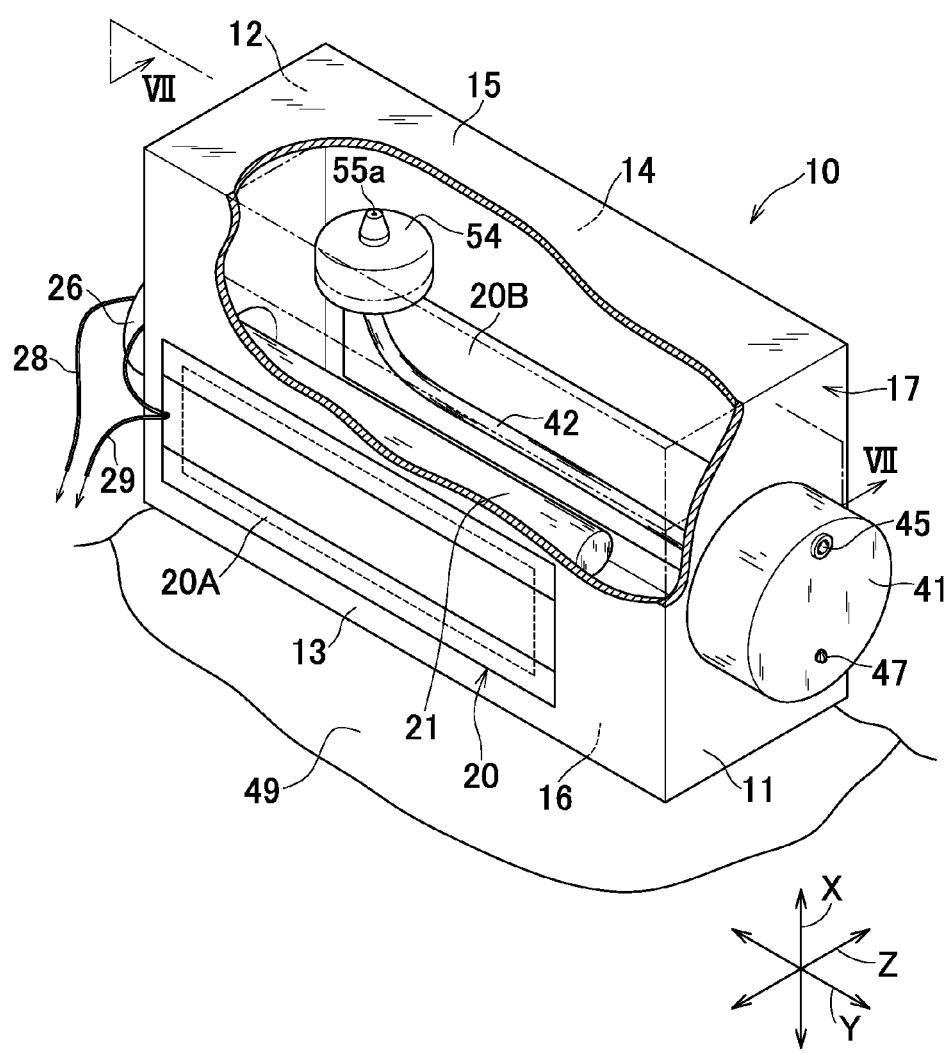
FIG. 6 is a partially cutout perspective view of a magnesium-air fuel cell in a second embodiment.
Figure 7:
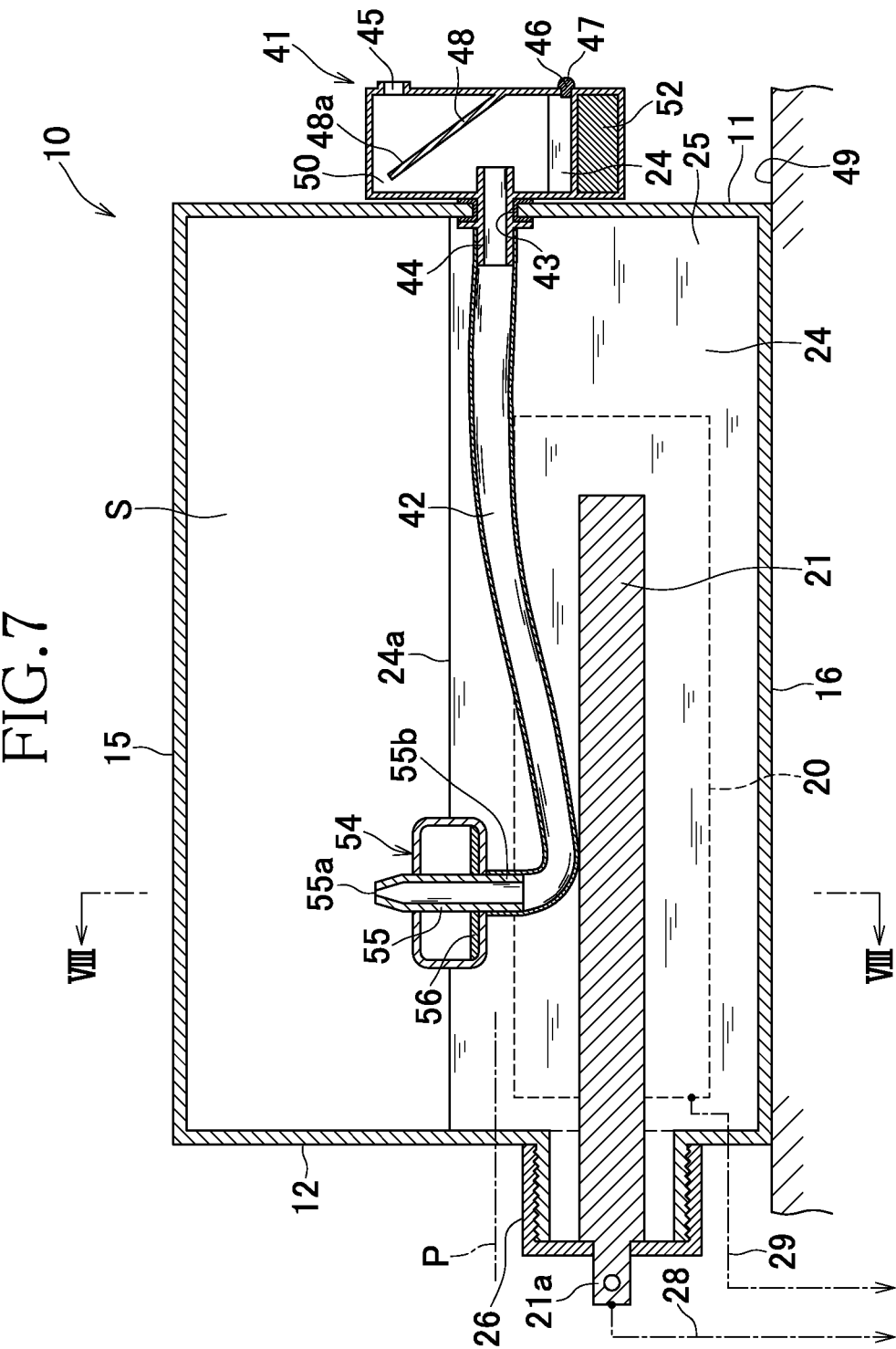
FIG. 7 is a schematic cross-sectional view taken along line VII-VII in FIG. 6.

As illustrated in FIGS. 6 and 7, in a second embodiment, the magnesium-air fuel cell 10 is placed on a placement surface 49 and includes: a pair of cathode bodies 20A and 20B respectively positioned on the third surface 13 and the fourth surface 14; the anode body 21 inserted in the outer frame 17; and a ventilation system for discharging the produced gas in the outer frame 17. The anode body 21 is disposed between the pair of cathode bodies 20A and 20B. Thus, a larger amount of current can be generated compared with a case where a single cathode body 20A is used. The anode body 21 is disposed closer to the sixth surface 16 than a center line (center axis) P that bisects the length of the outer frame 17 in the width direction X. The amount of the reaction liquid 24 injected into the outer frame 17 corresponds to about 50 to 65% of the entire capacity of the outer frame 17.

A tank 41 and an air pipe 42 are further provided. The tank is used for ventilation and water storage and is positioned on an outer surface of the first surface 11 of the outer frame 17. The air pipe 42 is coupled to the tank 41 and is formed of a soft material such as silicone rubber. The tank 41 includes an extension portion 44 inserted into an opening (attachment hole) formed in the first surface 11 with a water cut-off seal 43 made of rubber provided therebetween. The tank 41 is rotatably attached to the outer frame 17 and can rotate 360° about the extension portion 44. The water cut-off seal 43 that has worn by sliding on the extension portion 44 through the repeated use may be replaced. The tank 41 includes: a ventilation hole 45 through which the produced gas, which has flowed into the tank 41, is discharged; and a water discharge hole 46 for discharging the reaction liquid 24, which has flowed into the tank 41. The water discharge hole 46 is sealed by a plug 47. In the tank 41, a partitioning wall (inner wall) 48 is disposed between the ventilation hole 45 and the water discharge hole 46. The reaction liquid 24, which has entered the air pipe 42 and moved to the tank 41 is stored on a side of the partitioning wall 48 facing the water discharge hole 46. A clearance 50 is formed between the inner wall of the tank 41 and a distal end 48a of the partitioning wall 48. A weight member 52 made of metal is disposed on a side of the water discharge hole 46 of the tank 41.

Figure 8:
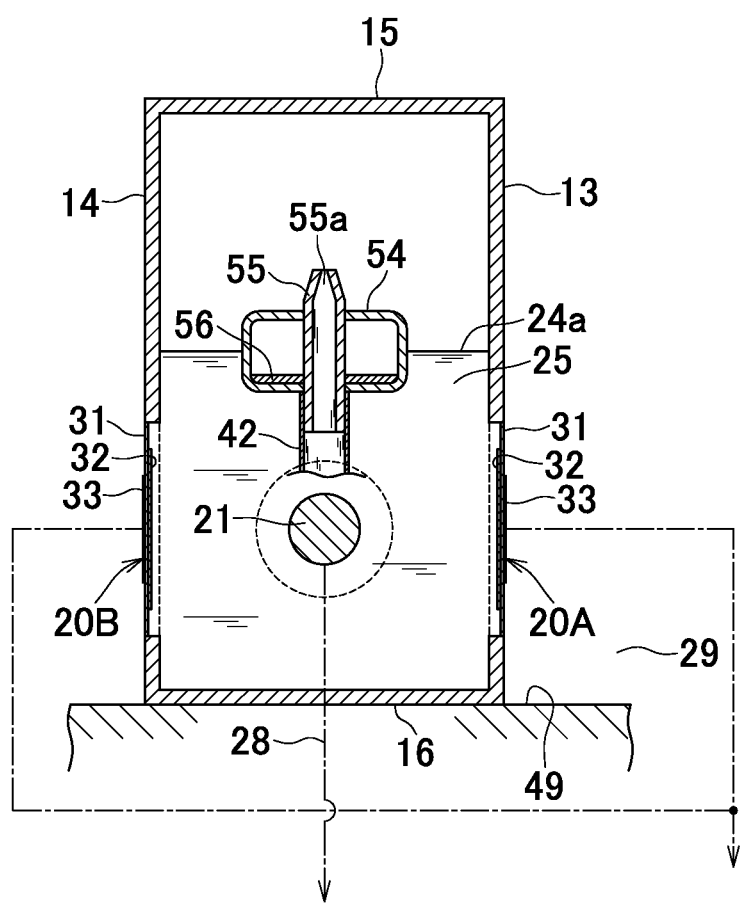
FIG. 8 is a schematic cross-sectional view taken along line VIII-VIII in FIG. 7.

As illustrated in FIG. 8, the tank 41 is rotatably coupled to the outer frame 17 as described above and the weight member 52 is disposed on the side of the water discharge hole 46. Thus, when the structure, in which the fifth surface 15 of the outer frame 17 is positioned on an upper side, is turned upside down so that the sixth surface 16 is positioned on the upper side, the tank 41 is rotated by the weight of the weight member 52 to have the side of the water discharge hole 46 disposed on a lower side.

A float 54, made of rubber or plastic, is coupled to the other end of the air pipe 42 through a joint 55 formed through a center portion of the float 54. The float 54 has hollow structure, and a weight member 56 made of metal is disposed on a side of the other end of the air pipe 42. The weight of the weight member 56 is adjusted in such a manner that about half the float 54 is exposed from a liquid surface 24a of the reaction liquid 24. An end of the joint 55 on a side projecting beyond the float 54 has a tapered shape and has an open end 55a. The tank 41, the air pipe 42, and the joint 55, which are formed as separate members and are coupled to each other in the present embodiment, may be partially or entirely molded as a single member.

In the present embodiment, the float 54 floats on a liquid surface so that the open end 55a of the joint 55 is positioned in the space S. Thus, the produced gas in the space S partially flows into the air pipe 42 through the open end 55a and moves to the tank 41, and then is discharged to the outside through the clearance 50. Thus, the pressure in the outer frame 17 can be reduced, whereby even when the amount of produced gas increases along the power generation time, the outer frame 17 can be prevented from cracking or the like due to the resultant internal pressure.

Figure 9:
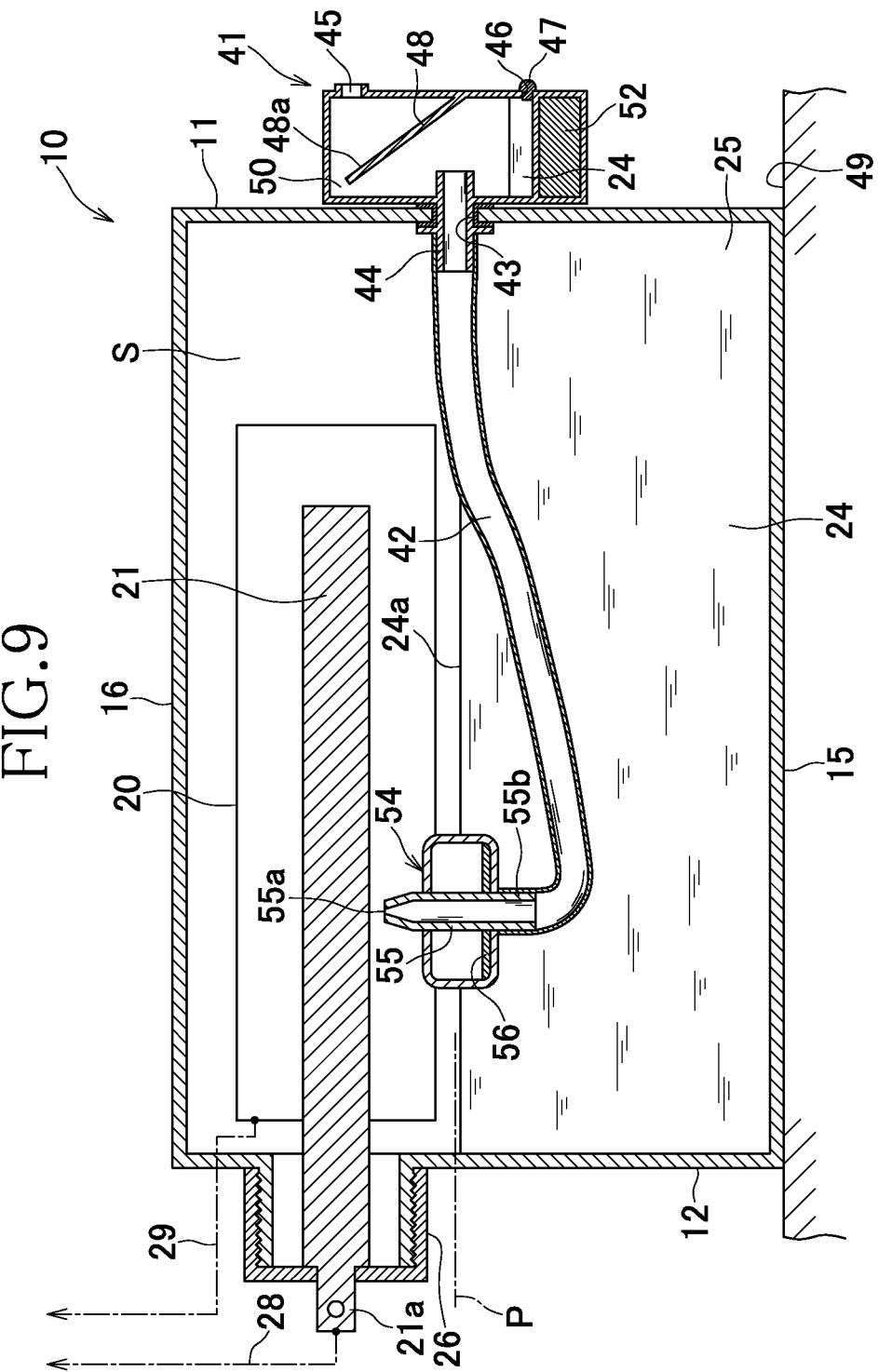
FIG. 9 is a schematic cross-sectional view that is similar to that in FIG. 7 and illustrates a non-active state of the magnesium-air fuel cell.

When the magnesium-air fuel cell 10 is turned upside down in the width direction X as illustrated in FIG. 9, that is, when the fifth surface 15 is the upper surface and the sixth surface 16 is the lower surface, the anode body 21 is disposed closer to the sixth surface 16 than the center line P and the liquid surface 24a of the reaction liquid 24 is not in contact with the anode body 21. Thus, the electrochemical reaction does not occur and thus the electromotive force is not produced. As described above, adjustment to turn ON and OFF the electromotive force can be achieved only by changing the orientation of the magnesium-air fuel cell 10.

<Third Embodiment>

Figure 10:
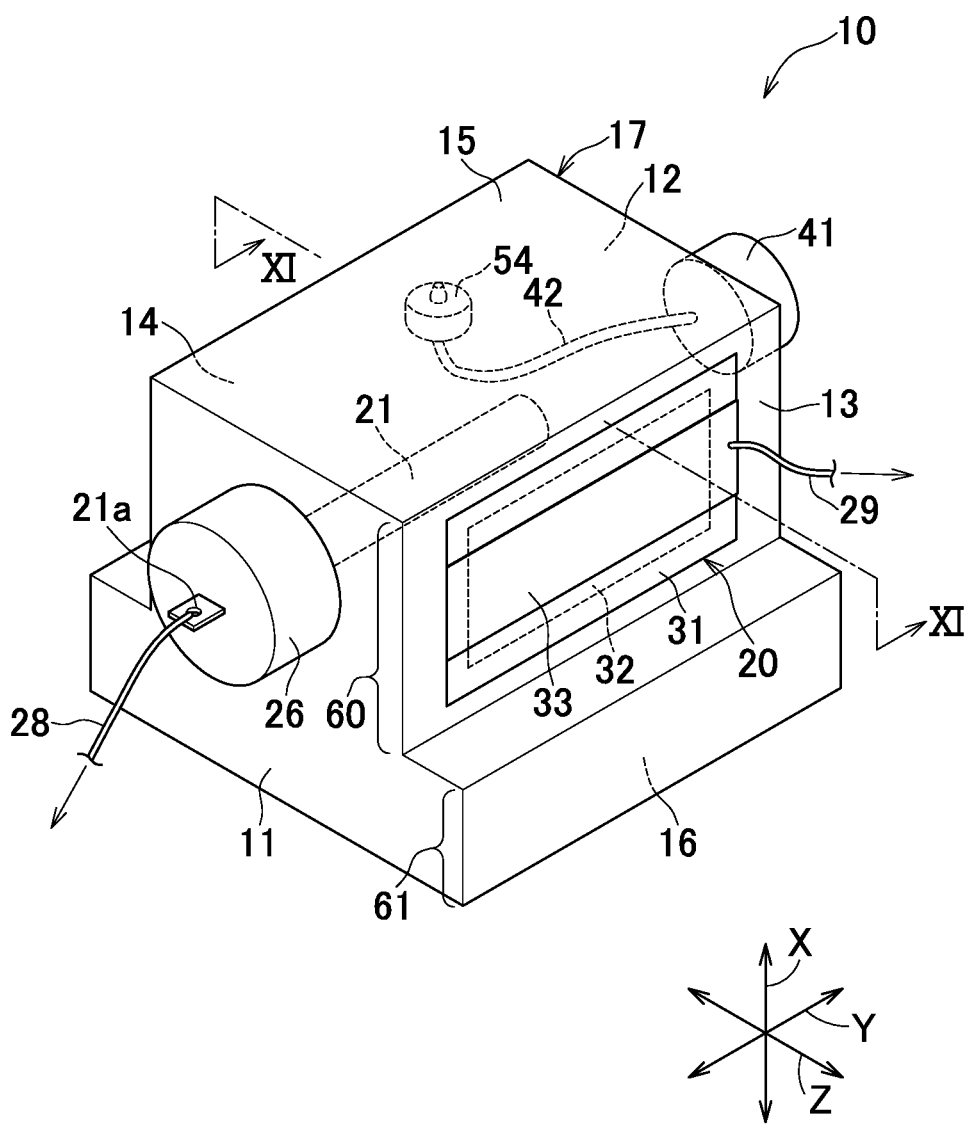
FIG. 10 is a perspective view of a magnesium-air fuel cell in a third embodiment.

As illustrated in FIGS. 10 and 11, the magnesium-air fuel cell 10 according to a third embodiment includes: the outer frame 17 having a cross-sectional shape with a protrusion; the cathode body 20 positioned on the third surface 13; the anode body 21 inserted in the outer frame 17; and the ventilation system. The outer frame 17 includes: a narrow portion 60 into which the anode body 21 is inserted; and a wide portion 61 positioned below the narrow portion 60. Inner portions of the narrow portion 60 and the wide portion 61 are in communication with each other. The reaction liquid 24 is injected into the outer frame 17, and the float 54 floats on the liquid surface 24a.

As a result of the electrochemical reaction between the anode body 21 and the cathode body 20, hydrogen gas is produced in the outer frame 17 as described above, and furthermore, the magnesium hydroxide deposits as sediment 64. When the sediment 64 comes into contact with or covers the anode body 21, the ionization of the anode body 21 is hindered, and the desired electromotive force might be failed to be produced. In the present embodiment, the anode body 21 is positioned in the narrow portion 60, and the sediment 64 deposits in the wide portion 61 having an inner space larger than the narrow portion 60. Thus, the deposited sediment 64 does not come into contact with the anode body 21. In the present embodiment, the ventilation system is optionally provided. Still, with the outer frame 17 having the shape described above, and with the ventilation system provided to the outer frame 17, the problems caused by the gas and the sediment 64 produced by the electrochemical reaction can be solved. The anode body 21 and the cathode body 20 may be positioned not in the narrow portion 60 but in the wide portion 61 as long as the effects described above can be provided. Still, a separation distance R of about 2 to 30 mm is preferably provided between the anode body 21 and the cathode body 20 to ensure the effective electrochemical reaction. Thus, because the separation distance R needs to be within a predetermined range, the cathode body 20 and the anode body 21 may be disposed in the narrow portion 60 so that larger storage space is achieved in the wide portion 61.

As illustrated in FIG. 12, in the outer frame 17, a pair of inner walls 68a and 68b that are separated from each other and face each other may be disposed between the narrow portion 60 and the wide portion 61. In such a case, the sediment 64 moves through a separated portion 69 between the inner walls 68a and 68b to be deposited in the wide portion 61. The width of the separated portion 69 is smaller than the width of the narrow portion 60. Thus, even when the narrow portion 60 is disposed on the lower side, a large amount of the sediment 64 does not move to the narrow portion 60.

<Fourth Embodiment>

Figure 13A:
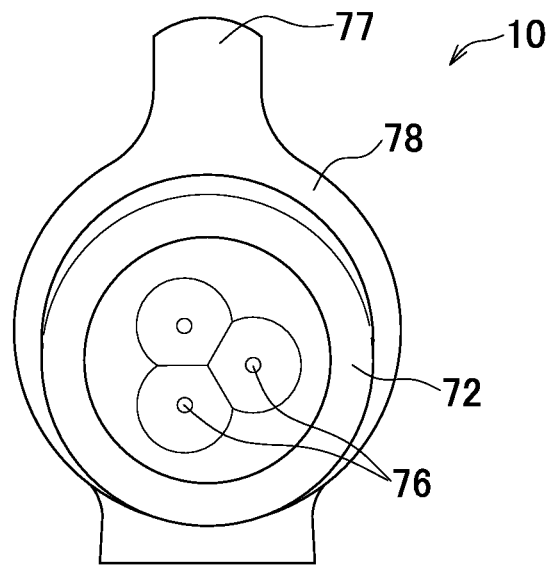
FIG. 13(a) is a front view of a magnesium-air fuel cell in a fourth embodiment.
Figure 13B:
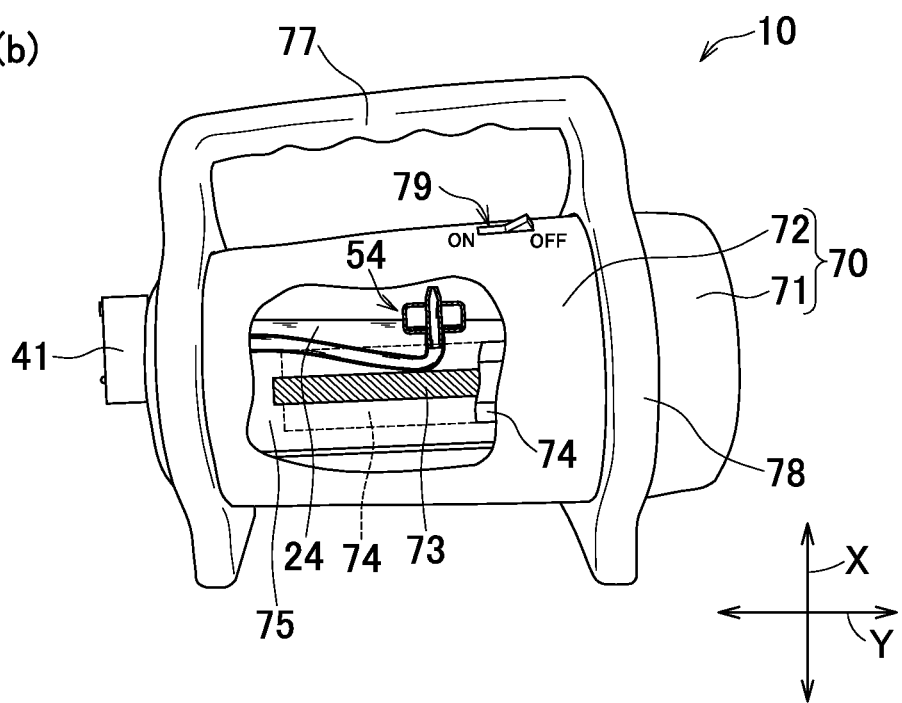
FIG. 13(b) is a partially cutout side view of the magnesium-air fuel cell in the fourth embodiment.

As illustrated in FIGS. 13(a) and 13(b), the magnesium-air fuel cell 10 according to a fourth embodiment is a potable light device and includes an outer frame 70 including a cylindrical main body 72 and a lid 71 that is detachably attached to the main body 72. In the outer frame 70, an anode body 73 having a cylindrical rod shape is positioned on one side of the center line P in the width direction X, and a pair of cathode bodies 74 are disposed on side surfaces. As in the second embodiment, an amount of reaction liquid 75 injected into the outer frame 70 corresponds to about 50 to 65% of the entire capacity of the outer frame 70. The lid 71 accommodates a plurality of light sources 76 such as an LED or an incandescent lamp. The light sources 76 are electrically coupled to a lead wire (not shown) extending from the anode body 73 and the cathode bodies 74, and are lit when the power is generated by the magnesium-air fuel cell 10.

The outer frame is rotatably attached to a support frame 78 having a gripping portion 77. When an operator rotates the outer frame 70 with respect to the support frame 78 to be upside down, so that the anode body 21 is prevented from coming into contact with the liquid surface 24a of the reaction liquid 24, electromotive force is not produced by the battery 10. An operation unit 79, for turning ON and OFF the power supply to the light sources 76, is disposed on the main body 71. Thus, the power supply to the light sources 76 can be cutoff even when the magnesium-air fuel cell 10 is in an active state. As described above, the light sources 76 can be easily turned ON and OFF by turning ON and OFF a power source through the operation of rotating the outer frame 70 (first power switch) and by turning ON and OFF the power source with the operation unit 79 (second power switch).

Components of the magnesium-air fuel cell 10 are not limited to the above-described components, and any other component used for an item of this type may be used. The lengths of the components in the embodiments may be appropriately changed in accordance with a required amount of electromotive force.

The invention claimed is:

1. A magnesium-air fuel cell, comprising:
an outer frame;
a cathode body fixed to the outer frame; and
an anode body positioned in the outer frame, wherein the cathode body includes:
  a first layer including a porous body formed by mixing a conductive carbon material and fluororesin;
  a second layer including a porous body formed by mixing activated carbon and fluororesin, the second layer being joined to one surface of the first layer to be in contact with reaction liquid in the outer frame; and
  a third layer,
the second layer has a shorter external length than the first layer, and
the third layer is thinner than the second layer.

2. The magnesium-air fuel cell according to claim 1, wherein the third layer, including a conductive metal material, is joined to another surface of the first layer on a side opposite to the one surface.

3. The magnesium-air fuel cell according to claim 1, wherein a mixing rate of the fluororesin mixed in the first layer is about 10 to 50% by weight, and a mixing rate of the fluororesin mixed in the second layer is about 3 to 30% by weight.

4. The magnesium-air fuel cell according to claim 1, wherein the third layer is a porous body.

5. The magnesium-air fuel cell according to claim 1, wherein an average pore diameter and a pore capacity of the first layer are respectively about 1 to 200 nm and 0.1 to 4.0 ml/g.

6. The magnesium-air fuel cell according to claim 1, wherein an average pore diameter and a pore capacity of the second layer are respectively about 1 to 200 nm and 0.1 to 3.0 ml/g.

7. The magnesium-air fuel cell according to claim 1, further comprising a light source electrically connected to the cathode body and the anode body.

8. The magnesium-air fuel cell according to claim 7, further comprising an operation unit with which power supply to the light source is able to be turned ON and OFF.

9. A magnesium-air fuel cell, comprising:
an outer frame;
a cathode body fixed to the outer frame; and
an anode body positioned in the outer frame, wherein the cathode body includes:
  a first layer including a porous body formed by mixing a conductive carbon material and fluororesin; and
  a second layer including a porous body formed by mixing activated carbon and fluororesin, the second layer being joined to one surface of the first layer to be in contact with reaction liquid in the outer frame,
the outer frame includes:
  a liquid injected area defined by the reaction liquid injected in the outer frame;
  a space positioned above the liquid injected area; and
  a ventilation system including a float that floats on a liquid surface of the liquid injected area and an air pipe through which produced gas in the outer frame is discharged,
the air pipe has one end coupled to an opening formed in an outer surface of the outer frame and another end coupled to a joint formed through the float, and
an open end of the joint is positioned in the space.

10. A magnesium-air fuel cell, comprising:
an outer frame;
a cathode body fixed to the outer frame; and
an anode body positioned in the outer frame, wherein the cathode body includes:
  a first layer including a porous body formed by mixing a conductive carbon material and fluororesin; and
  a second layer including a porous body formed by mixing activated carbon and fluororesin, the second layer being joined to one surface of the first layer to be in contact with reaction liquid in the outer frame,
the outer frame has a cross-sectional shape with a protrusion and includes a narrow portion and a wide portion having inner portions in communication with each other, and the anode body and the cathode body are positioned while facing each other in any one of the narrow portion and the wide portion.

11. The magnesium-air fuel cell according to claim 10, wherein a pair of inner walls that are separated from each other and face each other are disposed between the narrow portion and the wide portion in the outer frame.

* * * * *